(12) United States Patent
Yoshida et al.

(10) Patent No.: US 11,099,817 B1
(45) Date of Patent: Aug. 24, 2021

(54) GENERATION OF SOFTWARE PROGRAM REPAIR EXAMPLES

(71) Applicant: FUJITSU LIMITED, Kawasaki (JP)

(72) Inventors: Hiroaki Yoshida, Cupertino, CA (US);
Zhiqiang Zang, Austin, TX (US);
Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/061,377

(22) Filed: Oct. 1, 2020

(51) Int. Cl.
| | |
|---|---|
| G06F 9/44 | (2018.01) |
| G06F 8/34 | (2018.01) |
| G06F 8/71 | (2018.01) |
| G06F 11/36 | (2006.01) |
| G06F 8/40 | (2018.01) |

(52) U.S. Cl.
CPC .............. G06F 8/34 (2013.01); G06F 8/40 (2013.01); G06F 8/71 (2013.01); G06F 11/3684 (2013.01); G06F 11/3688 (2013.01)

(58) Field of Classification Search
CPC ..... G06F 8/34; G06F 8/40; G06F 8/71; G06F 11/3684; G06F 11/3688
USPC ........................................................ 717/109
See application file for complete search history.

(56) References Cited

U.S. PATENT DOCUMENTS

| | | |
|---|---|---|
| 10,496,459 B2 | 12/2019 | Yoshida |
| 10,606,570 B2 | 3/2020 | Yoshida |
| 2004/0034847 A1* | 2/2004 | Joffrain .................. G06F 8/34 717/113 |
| 2009/0043601 A1* | 2/2009 | Schuh .................. G06Q 10/06 705/305 |
| 2009/0125887 A1* | 5/2009 | Kahlon ............... G06F 11/3604 717/126 |
| 2019/0158120 A1* | 5/2019 | Andersson .......... H04L 67/1097 |
| 2019/0278572 A1* | 9/2019 | Yoshida .................... G06F 8/71 |
| 2019/0324893 A1* | 10/2019 | Vaishnav .............. G06N 20/00 |

OTHER PUBLICATIONS

CBCD: Cloned buggy code detector, author: J Li et al, published on 2012; source IEEE explore.*
Propagating bug fixes with fast subgraph matching, author: B Sun et al, published on 2010, source: IEEE.org.*

(Continued)

*Primary Examiner* — Chameli Das
(74) *Attorney, Agent, or Firm* — Maschoff Brennan

(57) ABSTRACT

Operations may include generating a first graphical representation of a buggy version of source code of a software program and generating a second graphical representation of a repaired version of the source code. The buggy version may include an error and the error has been corrected in the repaired version. The operations may also include identifying, as matching nodes, a first node of the first graphical representation and a second node of the second graphical representation that match each other. The operations may additionally include applying a same reduction to the first node and to the second node concurrently to generate a reduced buggy version of the source code and a reduced repaired version of the source code. Further, the operations may include generating a repair example with respect to correcting the error in which the repair example is based on the reduced buggy version and the reduced repaired version.

20 Claims, 14 Drawing Sheets

(56) References Cited

OTHER PUBLICATIONS

Automated bug removal for software defined network author Yang Wu et al, published on 2017.*
Delta Debugging: A. Zeller, "Yesterday, my program worked. Today it does not. Why?," FSE '99. Mar. 25, 1999.
Hierarchical Delta Debugging: G. Misherghi, Z. Su, "HDD: Hierarchical Delta Debugging," ICSE '06. May 20, 2006.
C. Sun et al., "Perses: Syntax-Guided Program Reduction," ICSE '18. May 27, 2018.
M. Hashimoto et al., "Automated patch extraction via syntax- and semantics-aware Delta debugging on source code changes," FSE '18. Mar. 5, 2018.

\* cited by examiner

Buggy Version ⟵702

```
String toString() {
  return super.toString();
}
boolean equals(Object obj) { return type.equals(((Account) obj).type);
}
```

704 🐞

Repaired Version ⟵706

```
int status = 0;
String toString() {
  return type;
}
boolean equals(Object obj) {
  if (!(obj instanceof Account) && status == 0)
    return false;
  return type.equals(((Account) obj).type);
}
```

Reduced Buggy Version ⟋740

```
String toString() {
  return super.toString();
}
boolean equals(Object obj) { return type.equals(((Account) obj).type);
}
```

Repaired Version ⟋742

```
int status = 0;
String toString() {
  return type;
}
boolean equals(Object obj) {
  if (!(obj instanceof Account) && status == 0)
    return false;
  return type.equals(((Account) obj).type);
}
```
708 points to the `if (!(obj instanceof Account)` line.

GENERATION OF SOFTWARE PROGRAM REPAIR EXAMPLES

FIELD

The embodiments discussed in the present disclosure are related to generation of software program repair examples.

BACKGROUND

Software programs often have errors in them (commonly referred to as "bugs") in which they may not operate as intended. Often automated repair systems are used in attempt to identify and correct errors in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to one or more embodiments, operations may include generating a first graphical representation of a buggy version of source code of a software program and generating a second graphical representation of a repaired version of the source code. The buggy version may include an error and the error has been corrected in the repaired version. The operations may also include identifying, as matching nodes, a first node of the first graphical representation and a second node of the second graphical representation that match each other. The operations may additionally include applying a same reduction to the first node and to the second node concurrently to generate a reduced buggy version of the source code and a reduced repaired version of the source code. The reduction may be applied concurrently to the first node and the second node in response to the first node and the second node being matching nodes. Further, the operations may include generating a repair example with respect to correcting the error in which the repair example is based on the reduced buggy version and the reduced repaired version.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 7A-7F illustrate an example application of one or more operations of the methods of FIGS. 4, 5, and 6;

DESCRIPTION OF EMBODIMENTS

Figure 1:
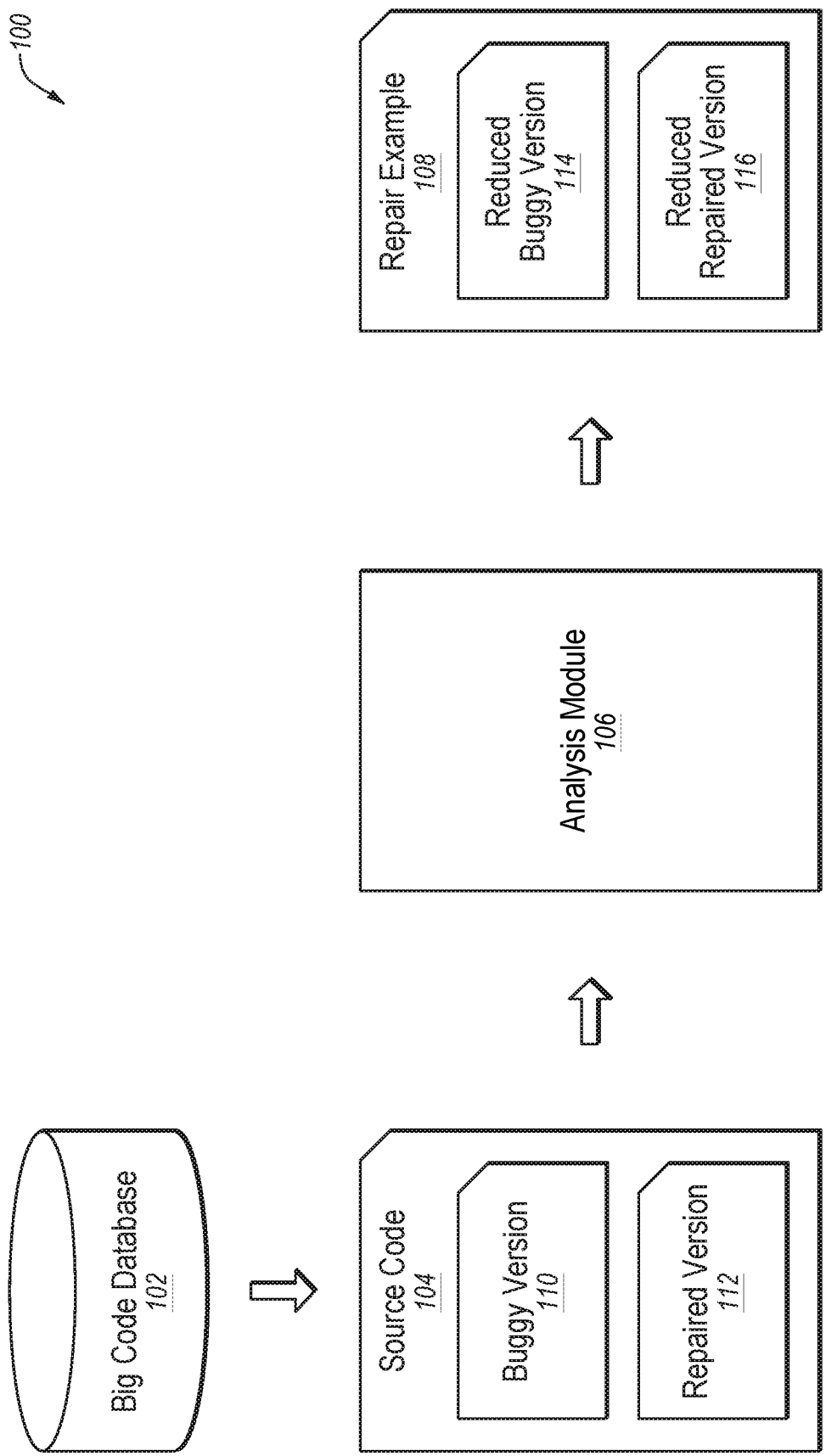
FIG. 1 is a diagram representing an example environment related to generating a repair example for software programs.

Some embodiments described in the present disclosure relate to methods and systems of repairing software programs. Software programs often include errors (also commonly referred to as "bugs") that may cause the software programs to behave in an unintended manner. Additionally, automated repair systems and techniques are often used to detect and correct errors to repair software programs.

Additionally, repositories of existing software programs may be used to identify edits that were made to the corresponding code to correct errors in the corresponding software program. In some instances, the repositories of existing software programs may include source code of a large number of software programs (e.g., thousands, tens of thousands, hundreds of thousands, millions, etc. of software programs). In the present disclosure, existing software programs and the corresponding source code that are stored in such repositories and that may be used to help develop other software programs may be referred to as "big code."

The big code repositories may include different versions (or sometimes referred to as "iterations") of the source code of the respective software programs in which the different versions are produced through one or more edits made to the source code. In some instances, the different versions of the source code may include a buggy version of the source code that includes a particular error. Further, the different versions may also include a corresponding repaired version of the source code that has repaired the particular error. In the present disclosure, reference to a "repaired version" of source code does not necessarily mean that all errors in the source code have been repaired, but that an error has been repaired.

According to one or more embodiments of the present disclosure, operations may be performed with respect to a buggy version of source code and a corresponding repaired version of source code. The operations may generate a repair example with respect to correcting a particular error of the buggy version. The operations may remove elements from the buggy version and the repaired version to prune the buggy version and the repaired version into a reduced buggy version and a reduced repaired version, respectively. The reduced buggy version and the reduced repaired version may be used as the repair example and may be a simplified repair example as compared to if the entire buggy version and/or the entire repaired version were used for the repair example.

According to one or more embodiments of the present disclosure, the technological field of software development may be improved by configuring a computing system to reduce buggy versions and corresponding repaired versions of source code. Such a configuration may allow the computing system to better generate and provide repair examples from existing code repositories because simplified repair examples may have a broader applicability, may use fewer computing resources, and may be more easily parsed to determine which types of edits may help to correct which types of errors.

In these or other embodiments, the computing system may be configured to use the extracted repair examples with respect to testing and/or developing other software programs. For example, the computing system may be configured to identify, in the big code, code patterns associated with the extracted repair examples. In these or other embodiments, the identified code patterns may be used to select or implement repairs of the repair examples (e.g., to select or implement repairs with similar code patterns) with respect to the code under test in response to the identified code patterns of the repair examples being the same or similar to code patterns associated with the code under test. For example, U.S. patent application Ser. No. 15/822,106 filed on Nov. 24, 2017 and U.S. patent application Ser. No. 15/915,894 filed on Mar. 8, 2018, which are both incorporated by reference herein in their entireties, discuss the use of code patterns in existing source code to implement repairs in other source code. In some embodiments, the use of simplified repair examples may facilitate the code pattern identification, which may improve the selection of which repair example to select as a repair and/or reduce the resources used to select the repair example.

Embodiments of the present disclosure are explained with reference to the accompanying drawings.

FIG. 1 is a diagram representing an example environment 100 related to generating a repair example for software programs, arranged in accordance with at least one embodiment described in the present disclosure. The environment 100 may include an analysis module 106 configured to analyze source code 104 of the software program to identify a repair example 108 with respect to an error of a buggy version 110 of the source code 104.

The source code 104 may include electronic data, such as, for example, the software program, code of the software program, libraries, applications, scripts, or other logic or instructions for execution by a processing device. In some embodiments, the source code 104 may include a complete instance of the software program. Additionally or alternatively, the source code 104 may include a portion of the software program. The source code 104 may be written in any suitable type of computer language that may be used for the software program.

In some embodiments, the source code 104 may include multiple versions of the code of the software program. For example, multiple edits may be made to the source code 104 as updates, patches, platform migrations, bug fixes, cosmetic rearrangement, etc. The multiple edits may thus result in two or more different versions of the source code 104. In these or other embodiments, the source code 104 may include two or more of such versions of the code of the software program in which one or more differences may exist between the different versions due to edits made between the iterations. Additionally, reference to an "edit" to source code in the present disclosure may include any number of modifications that may be made to one or more lines of code. For example, an edit may range from something as simple as a single element name change, element addition, or element deletion in a single line of code to something as complex as introducing or deleting a large number of lines of code. In some embodiments, the source code 104 may include the buggy version 110 of the code that may include a particular error. Further, the source code 104 may include a corresponding repaired version 112 of the code.

The analysis module 106 may include code and routines configured to enable a computing device to perform one or more operations. Additionally or alternatively, the analysis module 106 may be implemented using hardware including a processor, a microprocessor (e.g., to perform or control performance of one or more operations), a field-programmable gate array (FPGA), or an application-specific integrated circuit (ASIC). In some other instances, the analysis module 106 may be implemented using a combination of hardware and software. In the present disclosure, operations described as being performed by the analysis module 106 may include operations that the analysis module 106 may direct a corresponding system to perform. The analysis module 106 may be configured to perform a series of operations with respect to the source code 104 to generate the repair example 108 as follows below.

The analysis module 106 may be configured to obtain the source code 104, including multiple versions of the source code 104, such as one or more buggy versions and one or more corresponding repaired versions of the source code 104. In some embodiments, the analysis module 106 may be configured to obtain the source code 104 from a big code database 102. The big code database 102 may be a repository of existing software programs and their respective source code. In these or other embodiments, the big code database 102 may include different versions of the source code 104, such as buggy and corresponding repaired versions. Additionally or alternatively, the big code database 102 may be made available for analysis, which may help facilitate the development and debugging of other software programs.

In some embodiments, the analysis module 106 may be configured to generate the repair example 108 based on the buggy version 110 of the source code 104 and the corresponding repaired version 112 of the source code 104. The repair example 108 may include a reduced buggy version 114 of the source code 104 and a corresponding reduced repaired version 116 of the source code 104. The reduced buggy version 114 may have one or more elements removed as compared to the buggy version 110. Similarly, the reduced repaired version 116 may have one or more elements removed as compared to the repaired version 112.

The repair example 108 may be used to repair errors that are similar to the particular error of the buggy version 110. Further, the reduction of elements included in the repair example 108 may allow for more efficient identification of how to repair such errors. In some embodiments, the analysis module 106 may be configured to generate the repair example 108 according to one or more operations of methods 400, 500, 600, and/or 800 as discussed below with respect to FIGS. 4, 5, 6, and 8, respectively.

Modifications, additions, or omissions may be made to FIG. 1 without departing from the scope of the present disclosure. For example, the environment 100 may include more or fewer elements than those illustrated and described in the present disclosure.

Figure 2:
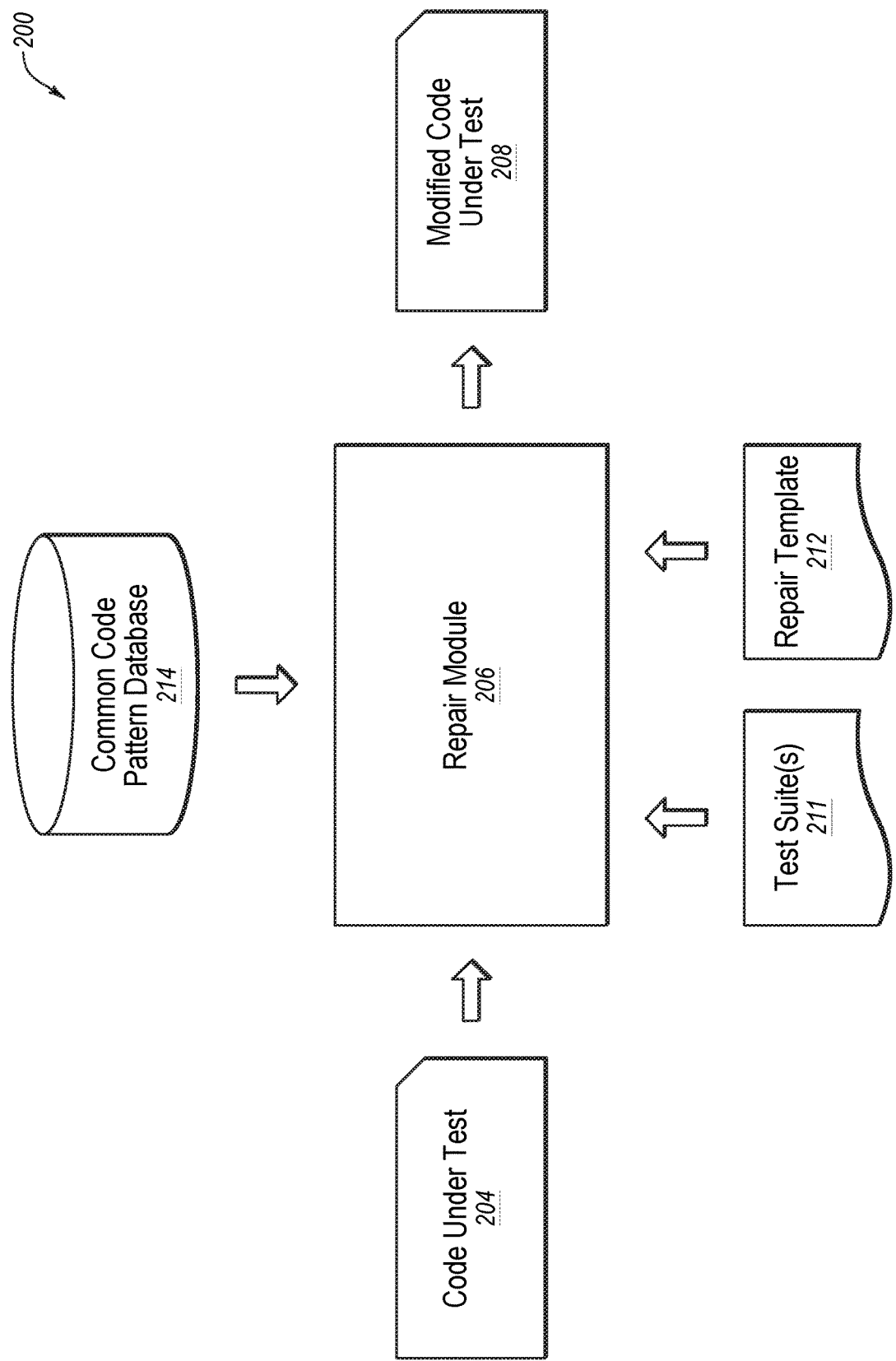
FIG. 2 is a diagram representing an example environment related to repairing a software program.

FIG. 2 is a diagram representing an example environment 200 related to repairing a software program, arranged in accordance with at least one embodiment described in the present disclosure. The environment 200 may include a repair module 206 configured to analyze code under test 204 for errors. The repair module 206 may also be configured to output modified code under test 208, which may include one or more modifications made to the code under test 204 by repair operations performed by the repair module 206.

The code under test 204 may include electronic data, such as, for example, the software program, source code of the software program, libraries, applications, scripts, or other logic or instructions for execution by a processing device. In some embodiments, the code under test 204 may include a complete instance of the software program. Additionally or alternatively, the code under test 204 may include a portion of the software program. The code under test 204 may be written in any suitable type of computer language that may be used for the software program.

The repair module 206 may include code and routines configured to enable a computing device to perform one or more modifications of the code under test 204 to generate the modified code under test 208. Additionally or alternatively, the repair module 206 may be implemented using hardware including a processor, a microprocessor (e.g., to perform or control performance of one or more operations), a field-programmable gate array (FPGA), or an application-specific integrated circuit (ASIC). In some other instances, the repair module 206 may be implemented using a combination of hardware and software. In the present disclosure, operations described as being performed by the repair module 206 may include operations that the repair module 206 may direct a corresponding system to perform.

The repair module 206 may be configured to perform a series of repair operations with respect to the code under test 204 that may be used to repair (also referred to as correct) one or more errors in the code under test 204. In some embodiments, the repair module 206 may be configured to perform one or more of the repair operations based on a repair template 212 and one or more test suites 211.

The repair template 212 may include any suitable type of instructions or routines that, when executed, may be configured to implement one or more modifications with respect to the code under test 204 in response to the presence of errors in the code under test 204. The modifications may include changes in the code under test 204 that may repair or attempt to repair the errors. In the present disclosure, the modifications that may be performed may be referred to as "repair candidates" or "repairs." In some embodiments, the repair template 212 may include one or more repairs or repair examples that may be used as the repair candidates. For example, the repair template 212 may include the repair example 108 of FIG. 1 that may be identified by the analysis module 106.

The test suites 211 may include one or more routines that may act as test cases for the code under test 204. The test suites 211 may be configured to determine whether the code under test 204 behaves in a specified manner. The test suites 211 may be configured according to any suitable technique.

The repair module 206 may be configured to apply one or more of the test suites 211 with respect to the code under test 204 to detect or determine one or more errors and corresponding error locations in the code under test 204. In some embodiments, the repair module 206 may be configured to execute one or more tests included in the test suites 211, which may be referred to as performing a test execution. A test execution that passes may be referred to as a "passing test execution" and a test execution that fails may be referred to as a "failing test execution." In some embodiments, an error location and corresponding error of the code under test 204 may be identified based on a failing test execution executing code appearing at the error location.

In some embodiments, the repair module 206 may be configured to obtain a repair candidate from the repair template 212 as a potential modification that may be made to repair a detected error. In some embodiments, the repair module 206 may obtain a repair code pattern of the repair candidate. For example, in some embodiments, the repair module 206 may be configured to obtain the repair code pattern such as described in U.S. patent application Ser. No. 15/822,106.

In some embodiments, the repair module 206 may be configured to access a common code pattern database 214. The common code pattern database 214 may include common code patterns that may be derived from big code. For example, the common code patterns may be derived from existing code of existing software programs that may be stored in one or more repositories of existing software programs. In some embodiments, the common code patterns may be obtained such as described in U.S. patent application Ser. No. 15/822,106.

In some embodiments, the repair module 206 may be configured to select or prioritize repair candidates for the correction of error based on associations between code patterns of the repair candidates and the common code patterns such as described in U.S. patent application Ser. No. 15/822,106.

In some embodiments, the repair module 206 may also be configured to perform repairs on the code under test 204 based on the prioritization of the repair candidates. For example, the repair module 206 may implement as potential repairs, the repair candidates in descending order from highest prioritization to lowest prioritization. Additionally or alternatively, the repair module 206 may be configured to output the modified code under test 208, which may include one or more repairs that may be implemented based on the prioritization of the repair candidates.

Modifications, additions, or omissions may be made to FIG. 2 without departing from the scope of the present disclosure. For example, the environment 200 may include more or fewer elements than those illustrated and described in the present disclosure. In addition, in some embodiments, one or more routines, one or more instructions, or at least a portion of code of the repair module 206, the test suites 211, and the repair template 212 may be combined such that they may be considered the same element or may have common sections that may be considered part of two or more of the repair module 206, the test suites 211, and the repair template 212.

Figure 3:
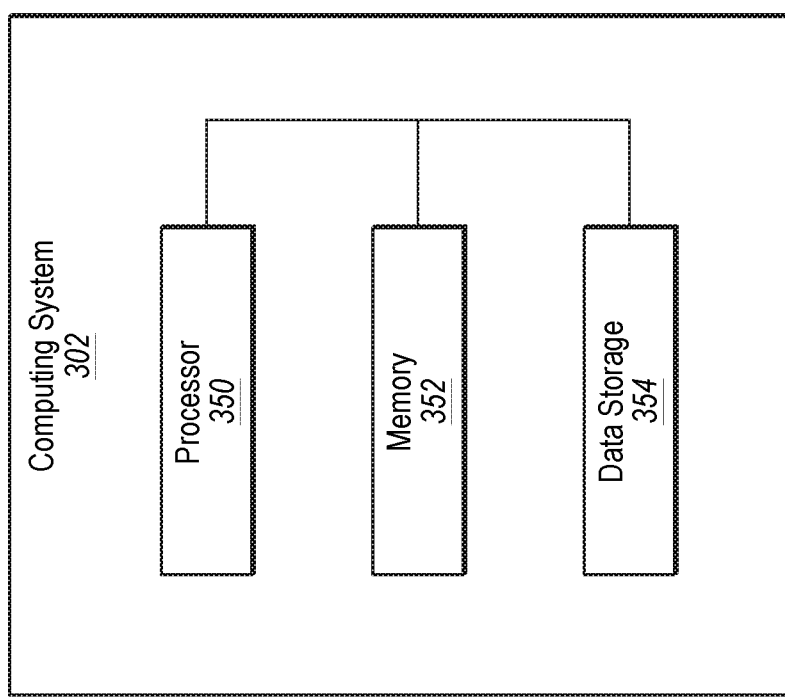
FIG. 3 illustrates a block diagram of an example computing system.

FIG. 3 illustrates a block diagram of an example computing system 302, according to at least one embodiment of the present disclosure. The computing system 302 may be configured to implement or direct one or more operations associated with an analysis module (e.g., the analysis module 106 of FIG. 1 and/or a repair module (e.g., the repair module 206 of FIG. 2). The computing system 302 may include a processor 350, a memory 352, and a data storage 354. The processor 350, the memory 352, and the data storage 354 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

For example, in some embodiments, one or more of the above mentioned modules (e.g., the analysis module and/or the repair module) may be included in the data storage 354 as program instructions. The processor 350 may fetch the program instructions of a corresponding module from the data storage 354 and may load the program instructions of the corresponding module in the memory 352. After the program instructions of the corresponding module are loaded into memory 352, the processor 350 may execute the program instructions such that the computing system may implement the operations associated with the corresponding module as directed by the instructions.

The memory 352 and the data storage 354 may include computer-readable storage media for carrying or having computer-executable instructions or data structures stored thereon. Such computer-readable storage media may include any available media that may be accessed by a general-purpose or special-purpose computer, such as the processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 350 to perform a certain operation or group of operations.

Modifications, additions, or omissions may be made to the computing system 302 without departing from the scope of the present disclosure. For example, in some embodiments, the computing system 302 may include any number of other components that may not be explicitly illustrated or described.

Figure 4:
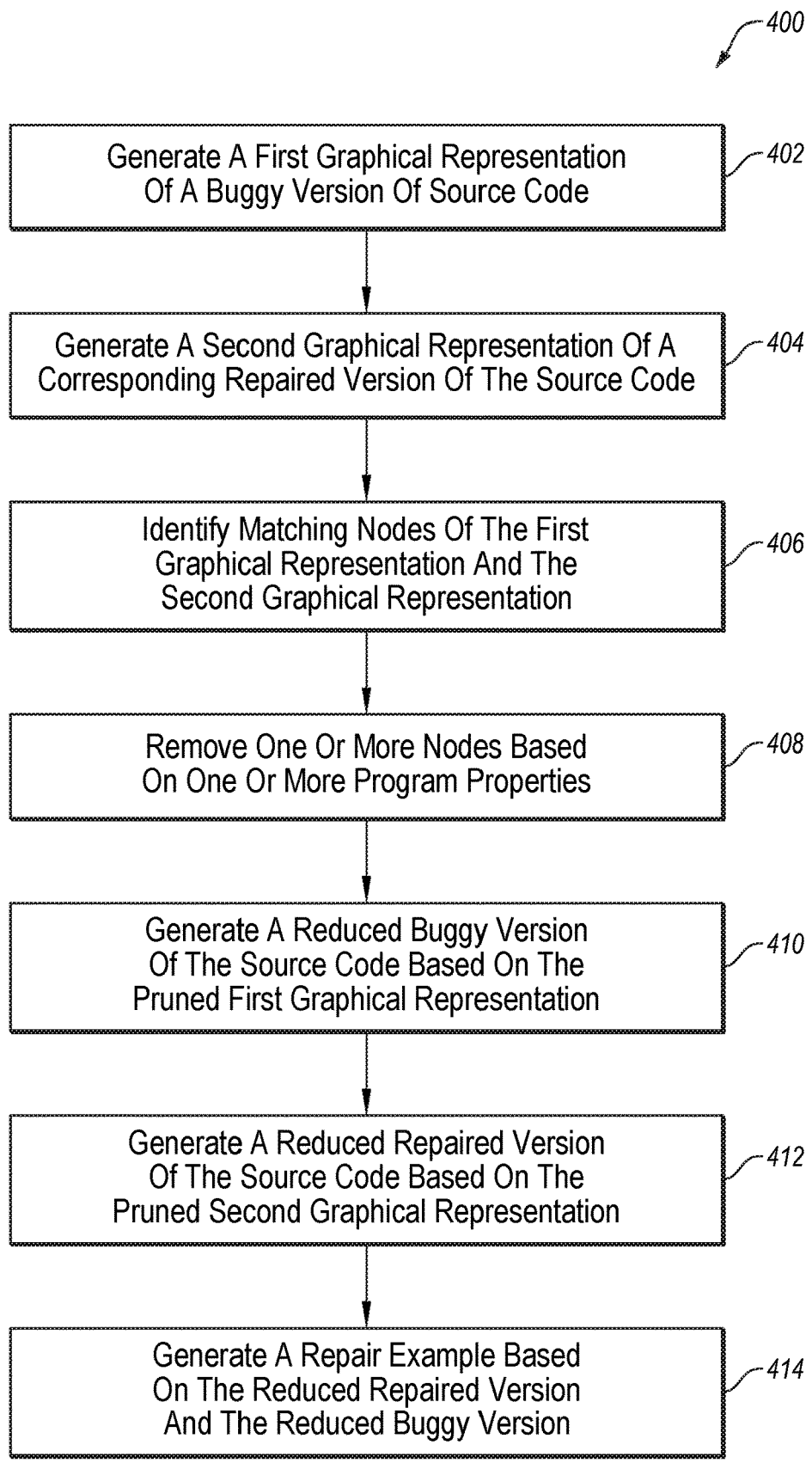
FIG. 4 is a flowchart of an example method of generating a repair example.

FIG. 4 is a flowchart of an example method 400 of generating a repair example, according to at least one embodiment described in the present disclosure. The method 400 may be performed by any suitable system, apparatus, or device. For example, one or more of the analysis module 106 of FIG. 1 and the repair module 206 of FIG. 2 or the computing system 302 of FIG. 3 (e.g., as directed by one or more modules) may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, at which a first graphical representation of a buggy version of source code may be generated. The source code and corresponding buggy version may be obtained from a big code database in some embodiments. Additionally, the buggy version may include a particular error.

The first graphical representation may include a first tree structure in some embodiments. Additionally or alternatively, the first tree structure may include nodes that each correspond to a program element of the buggy version of the source code. In these or other embodiments, the first tree structure may be organized in a hierarchal manner based on a structure of the buggy version of the source code. The first tree structure may be generated using any suitable technique. For example, in some embodiments, the tree structure may be an abstract syntax tree generated according to any suitable technique.

At block 404, a second graphical representation of a repaired version of the source code may be generated. The repaired version may correspond to the buggy version in that the repaired version may correct the particular error of the buggy version. The second graphical representation may be generated in an analogous manner as the first graphical representation.

At block 406, matching nodes of the first graphical representation and of the second graphical representation may be identified. A set of matching nodes may correspond to matching program elements of the buggy version and the repaired version.

For example, the first graphical representation may include a first node that corresponds to a first program element of the buggy version. Further, the second graphical representation may include a second node that corresponds to a second program element of the repaired version. The first program element and the second program element may be the same and used in the same place respectively in the buggy version and the repaired version such that the first node and the second node may also match. The first node and the second node may accordingly be considered matching nodes or a set of matching nodes. In some embodiments, matching nodes between the first graphical representation and the second graphical representation may be indicated as such by including matching edges between the respective nodes of the respective graphical representations.

Figure 7B:
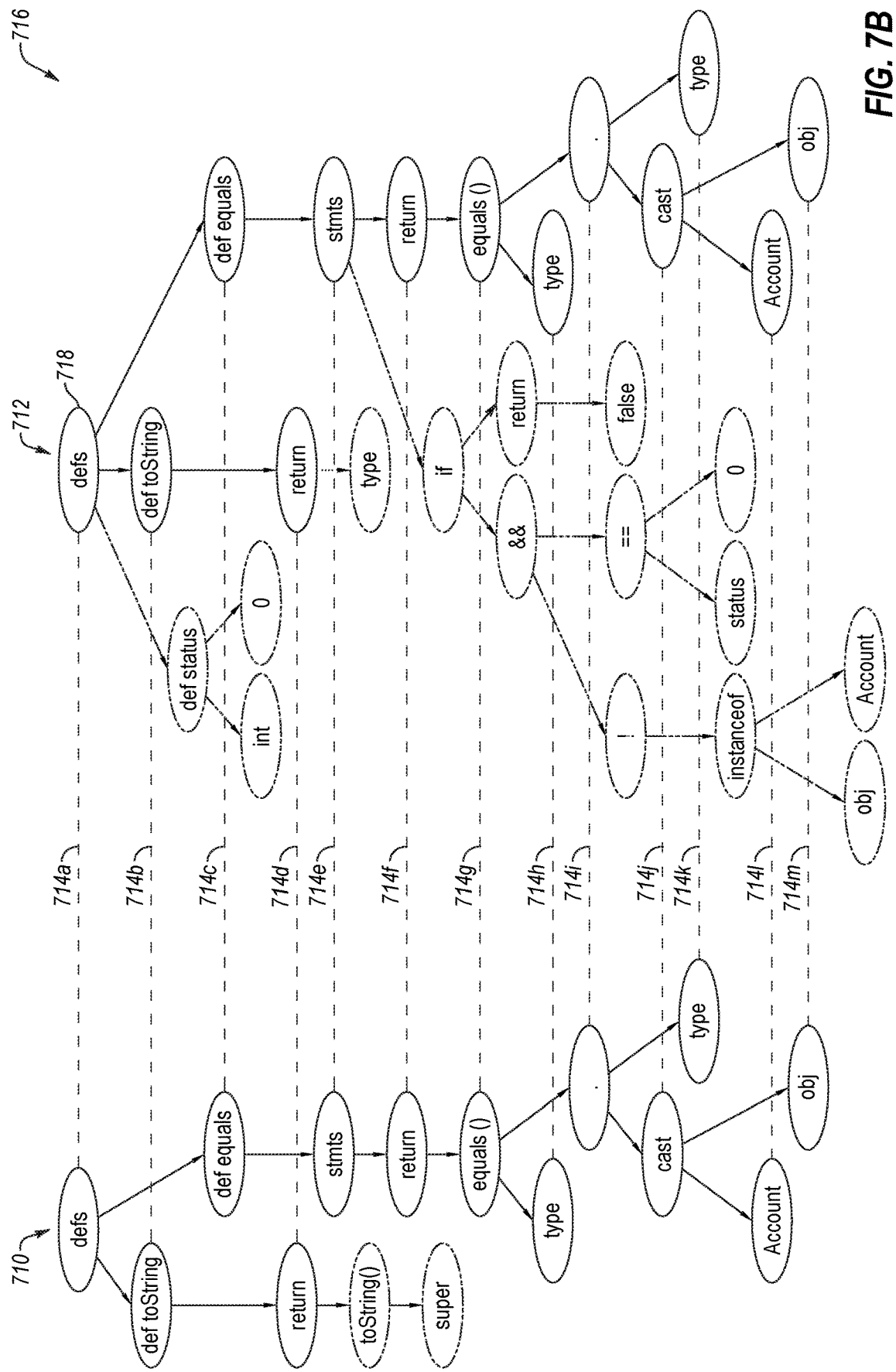

The first graphical representation and the second graphical representation linked with matching edges may be referred to as a program pair representation. The program pair representation may represent the buggy version and the repaired version and the node matchings between the first graphical representation and the second graphical representation. FIGS. 7A and 7B discussed in further detail below illustrate an example of generation of a program pair representation that may correspond to blocks 402, 404, and 406.

Returning to FIG. 4, the method 400, at block 408, one or more reductions may be applied to nodes of the program pair representation such that the first graphical representation and the second graphical representation may be pruned. The reductions may be based on one or more program properties and may reduce the graphical representations of the program pair representation concurrently. By contrast, other techniques may perform reductions of the graphical representations separately. Concurrent reduction may allow for more accurate identification of a repair example from the buggy version and the repaired version.

In some embodiments, the concurrent reduction may be based on syntax-aware reduction rules that preserve the node matchings. The rules may be such that syntactically-valid code may remain after the reductions by removing elements from the code that do not contribute to the overall functionality of the code. In these or other embodiments, the concurrent reduction may attempt to reduce or minimize the number of unmatched nodes of the graphical representations. Further, the concurrent reduction may attempt to reduce or minimize the total number of nodes of the program pair representation.

In some embodiments, the reduction strategy may include applying reduction rules on all the nodes in a top down manner in which the rules are applied in descending order of the subtree size of the nodes. In instances in which two or more nodes have subtrees that are the same size, subtrees with the most unmatched nodes may be reduced first to prioritize path reduction. In these or other embodiments, the reduction rules may be applied in a fixed-point iterative manner until no further reduction may be made. The fixed point iterative approach may help increase the amount of reduction because in some instances, performance of a particular reduction may allow for further reductions to be performed.

The reduction rules may indicate which types of nodes may be removed as part of the reduction process. For example, in some embodiments, a first reduction rule may be that any node may be replaced with one of its compatible descendent nodes. A compatible descendent node may include any node that may have a same expression type as the parent or ancestor node. In some embodiments, reduction based on the first reduction rule may be performed based on one or more operations described below with respect to FIG. 5.

Additionally or alternatively, in some embodiments, a second reduction rule may be that a descendent node of a compound node may be removed. In the present disclosure, a "compound node" may refer to a node that includes more than one path descending therefrom. Example compound nodes may include nodes that correspond to branching type code elements. For example, nodes that correspond to "clefs" and "stmts" code elements may be compound nodes. In some embodiments, the reduction based on the second reduction rule may be such that one or more entire paths of the compound node may be removed. In some embodiments, reduction based on the second reduction rule may be performed based on one or more operations described below with respect to FIG. 6.

Additionally or alternatively, a third reduction rule may include applying multiple transformations to code elements that correspond to a node together. In some embodiments, the transformations may be such that they change (e.g., simplify) the corresponding nodes but do not remove the corresponding node. For example, a transformation may include removal of "type" arguments and application of the third reduction rule may be such that member annotations that correspond to the "type" arguments are removed together with the removal of the corresponding "type" arguments. Another example transformation may include voiding "return type" elements and the third reduction rule may be such that return statements that correspond to the "return type" may be removed when voiding the "return type elements." Therefore, in some embodiments, the reductions may include simplifying one or more nodes without removing the nodes completely.

In these or other embodiments, a fourth reduction rule may include applying a same reduction to matching nodes. In other words, any reduction (e.g., removal or transformation) that is applied to a first node of a pair of matching nodes is also applied to a second node of the pair of matching nodes. In these or other embodiments, the reduction may include removing the nodes according to the first and second reduction rules described above and/or transforming one or more elements of the nodes according to the third reduction rule.

During the reduction at block 408, proposed reductions may be obtained based on one or more of the reduction rules. In these or other embodiments, the proposed reductions may be accepted or rejected based on whether or not one or more properties are maintained with respect to the corresponding graphical representations and associated code. For example, a first property may correspond to the first graphical representation and the buggy version and a second property may correspond to the second graphical representation and the repaired version.

In some embodiments, the first property may be that the buggy version still includes the error after the reduction has been applied. Additionally or alternatively, the second property may be that the error is still corrected in the repaired version after the reduction has been applied. In instances in which the proposed reduction corresponds to and is applied to matching nodes, the proposed reduction may be accepted only in response to satisfaction of the first property and the second property.

In instances in which the proposed reduction applies to an unmatched node, the proposed reduction may be accepted in response to satisfaction of the corresponding applicable property. For example, in instances in which the proposed reduction is with respect to a node that corresponds to the buggy version, the proposed reduction may be accepted or rejected depending on whether the first property is satisfied. As another example, in instances in which the proposed reduction is with respect to a node that corresponds to the repaired version, the proposed reduction may be accepted or rejected depending on whether the second property is satisfied.

In some instances, strict application of the fourth reduction rule with respect to applying the same reduction to corresponding matching nodes may inhibit other reductions that may be made. As such, in some instances, one or more pairs of matching nodes may be unlinked to allow for further reduction. In some embodiments, the unlinking of matching nodes may be performed based on one or more operations described below with respect to FIG. 8.

At block 410, a reduced buggy version of the source code may be generated based on the pruned first graphical representation. At block 412, a reduced repaired version of the source code may be generated based on the pruned second graphical representation. The generation of the reduced buggy version and the reduced repair version may be accomplished using any suitable technique that may generate source code based on a graphical representation such as a tree graph of a program.

At block 414, a repair example may be generated based on the reduced repair version and the reduced buggy version. For example, the repair example may include the reduced repair version and the reduced buggy version. Additionally or alternatively, the repair example may include the operations that are made to transform the reduced buggy version into the reduced repaired version. As indicated above, the repair example may be used to correct errors of a similar type in other source code.

Modifications, additions, or omissions may be made to the method 400 without departing from the scope of the present disclosure. For example some of the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the source code that is analyzed in the method 400 may be first source code and the error in the buggy version of the first source code may be a first error. In these or other embodiments, the method 400 may include identifying a second error in second source code of a second software program. The second error may be of a same type of error as the first error. Additionally or alternatively, the second error may be repaired based on the repair identified at block 410 based on the second error being of the same type as the first error and based on the identified repair correcting the first error.

Figure 5:
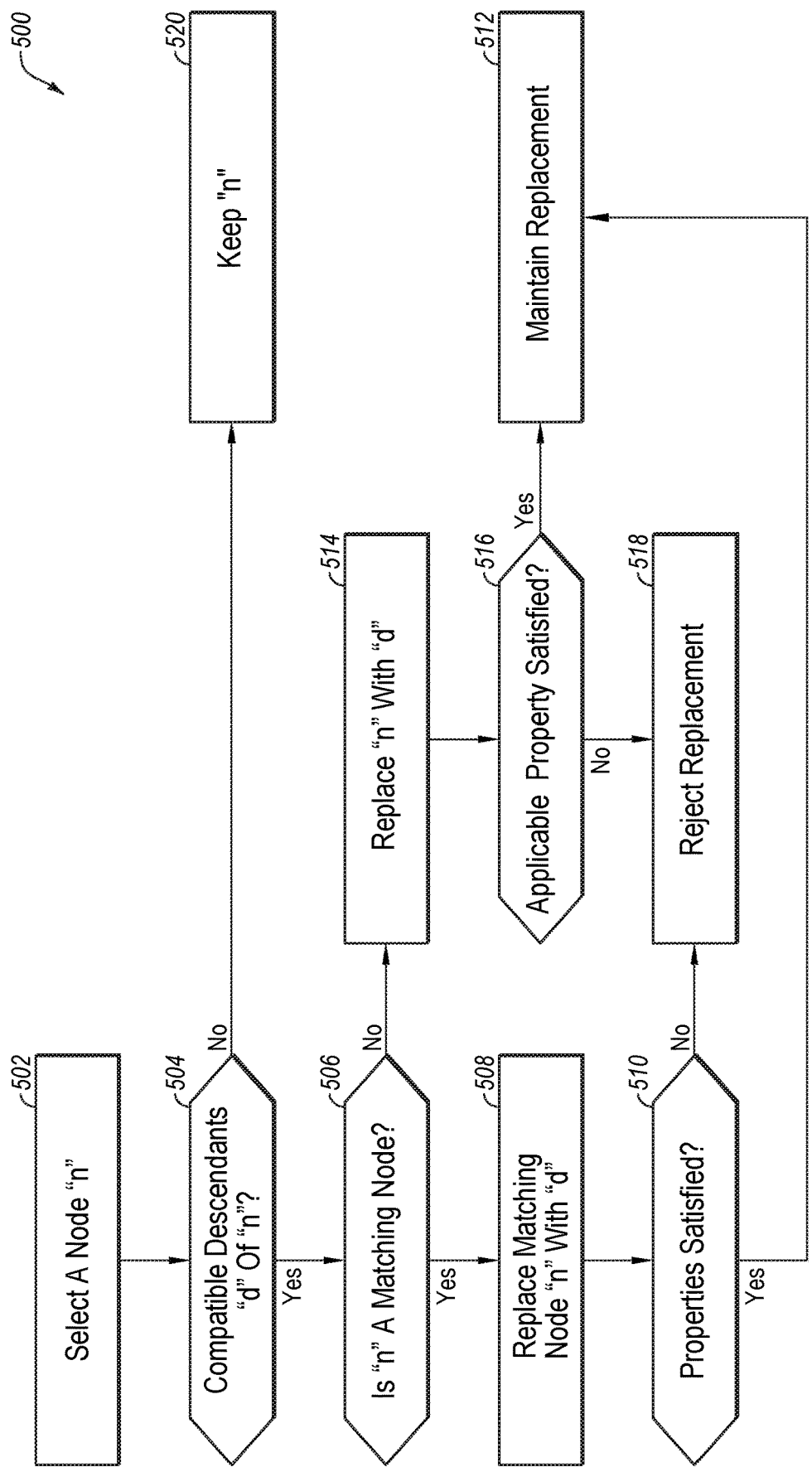
FIG. 5 is a flowchart of an example method of removing nodes from a program pair representation.

FIG. 5 is a flowchart of an example method 500 of removing nodes from a program pair representation, according to at least one embodiment described in the present disclosure. In some embodiments, one or more of the operations of block 408 described above with respect to the method 400 of FIG. 4 may be performed according to the method 500. As indicated above, the method 500 illustrates example operations that may be performed to remove nodes from a program pair representation based on the first reduction rule related to replacement of a node with a compatible descendent node. As described above, the program pair representation may be of a buggy version of source code and a corresponding repaired version of source code and may include a first graphical representation that represents the buggy version and a second graphical representation that represents the repaired version.

The method 500 may be performed by any suitable system, apparatus, or device. For example, one or more of the analysis module 106 of FIG. 1 or the computing system 302 of FIG. 3 (e.g., as directed by one or more modules) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, at which a node "n" may be selected from the program pair representation. As indicated above, in some embodiments, the node "n" may be selected based on the node "n" having the largest subtree. The node "n" may be included only in a first program representation of the program pair representation or only in a second program representation of the program pair representation in some embodiments. Additionally or alternatively, the node "n" may be a matching node that is included in both the first program representation and the second program representation.

At block 504, it may be determined whether there are any compatible descendant nodes "d" of the node "n." As also indicated above, a compatible descendent "d" may be a descendent node of the node "n" that may be of the same expression type.

In response to "n" not having any compatible descendants, the method 500 may proceed from block 504 to block 520. At block 520, the node "n" may be kept in the program pair representation.

In response to "n" having a compatible descendant "d", the method 500 may proceed from block 504 to block 506. At block 506 it may be determined whether "n" is a matching node. In response to "n" being a matching node, the method 500 may proceed from block 506 to block 508.

At block 508, the matching node "n" may be replaced with "d" in both the first graphical representation and the second graphical representation. In some embodiments, replacement of the matching node "n" with "d" may include removing the matching node "n" and adding an edge in the corresponding graphical representation directly between the parent node of "n" and "d." Following block 508, the method 500 may proceed to block 510.

At block 510, it may be determined whether the first and second properties are satisfied. As indicated above, the first property may be that the buggy version still includes the error after the reduction has been applied. As such, at block 510 it may be determined whether the buggy version still includes the error after the node "n" has been replaced with "d" in the first graphical representation of the program pair representation. Additionally or alternatively, the second property may be that the error is still corrected in the repaired version after the reduction has been applied. As such, at block 510 it may also be determined whether the repaired version still corrects the error after the node "n" has been replaced with "d" in the second graphical representation of the program pair representation.

In response to both properties being satisfied (e.g., the modified buggy version still includes the error and the modified repaired version still corrects the error), the method 500 may proceed from block 510 to block 512. At block 512, the replacement of "n" with "d" in both the first graphical representation and the second graphical representation may be maintained.

Alternatively, in response to one or both of the properties not being satisfied (e.g., the modified buggy version does not include the error and/or the modified repaired version does not correct the error), the method 500 may proceed from block 510 to block 518. At block 518, the replacement of "n" with "d" in both the first graphical representation and the second graphical representation may be rejected.

Returning to block 506, in response to "n" not being a matching node, the method 500 may proceed from block 506 to block 514. At block 514, the node "n" may be replaced with "d" in the graphical representation of which the node "n" is included. Following block 514, the method 500 may proceed to block 516.

At block 516, it may be determined whether the property that corresponds to the graphical representation of which the node "n" is included is satisfied. For example, in instances in which "n" is included in the first graphical representation that represents the buggy version, it may be determined whether the first property is satisfied after replacement of "n" with "d". Similarly, in instances in which "n" is included in the second graphical representation that represents the repaired version, it may be determined whether the second property is satisfied after replacement of "n" with "d".

In response to the applicable property being satisfied (e.g., the modified buggy version still includes the error or the modified repaired version still corrects the error), the method 500 may proceed from block 516 to block 512. At block 512, the replacement of "n" with "d" in the corresponding graphical representation may be maintained.

Alternatively, in response to the applicable property not being satisfied (e.g., the modified buggy version does not include the error or the modified repaired version does not correct the error), the method 500 may proceed from block 516 to block 518. At block 518, the replacement of "n" with "d" in the corresponding graphical representation may be rejected.

Modifications, additions, or omissions may be made to the method 500 without departing from the scope of the present disclosure. For example, the operations of method 500 may be implemented in differing order. Further, in some embodiments, the method 500 may be performed iteratively in a top down manner with respect to each of the nodes of the graphical representations of the program pair representations.

Figure 6:
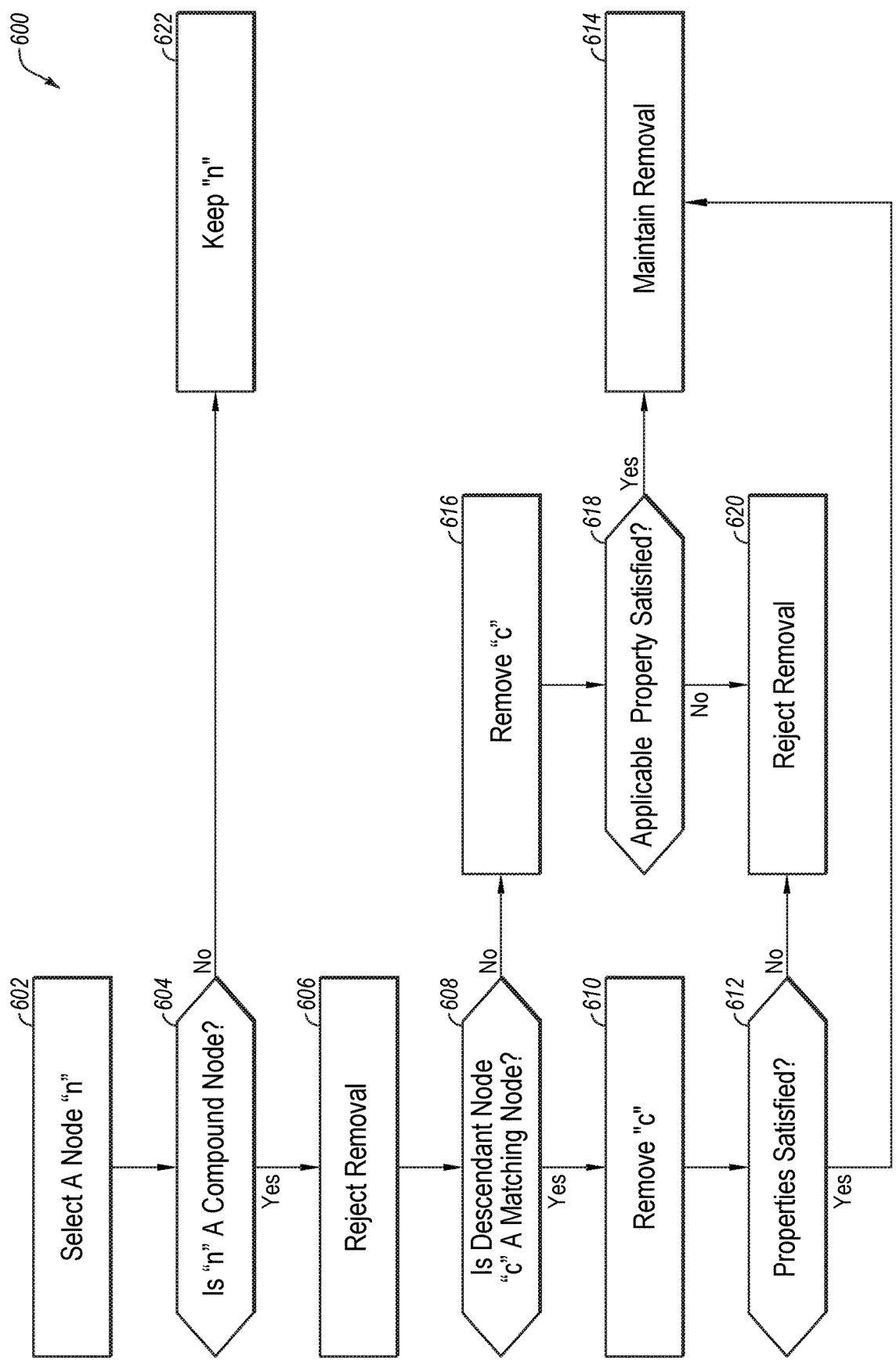
FIG. 6 is a flowchart of another example method of removing nodes from a program pair representation.

FIG. 6 is a flowchart of an example method 600 of removing nodes from a program pair representation, according to at least one embodiment described in the present disclosure. In some embodiments, one or more of the operations of block 408 described above with respect to the method 400 of FIG. 4 may be performed according to the method 600. As indicated above, the method 600 illustrates example operations that may be performed to remove nodes from a program pair representation based on the second reduction rule related to removal of descendent nodes of compound nodes. As described above, the program pair representation may be of a buggy version of source code and a corresponding repaired version of source code and may include a first graphical representation that represents the buggy version and a second graphical representation that represents the repaired version.

The method 600 may be performed by any suitable system, apparatus, or device. For example, one or more of the analysis module 106 of FIG. 1 or the computing system 302 of FIG. 3 (e.g., as directed by one or more modules) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 602, at which a node "n" may be selected from the program pair representation. As indicated above, in some embodiments, the node "n" may be selected based on the node "n" having the largest subtree. The node "n" may be included only in a first program representation of the program pair representation or only in a second program representation of the program pair representation in some embodiments. Additionally or alternatively, the node "n" may be a matching node that is included in both the first program representation and the second program representation. In some embodiments, the selection of the node "n" at block 502 of FIG. 5 may be used as the selection of the node "n" at block 602. For example, in some embodiments, the method 600 may be performed after block 520 of the method 500 of FIG. 5 and the selection of "n" at block 502 may be used as the selection of "n" at block 602.

At block 604, it may be determined whether the node "n" is a compound node. The node "n" may be considered a compound node in response to "n" having more than one descendent branch in some embodiments.

In response to "n" not being a compound node, the method 600 may proceed from block 604 to block 622. At block 622, the node "n" may be kept in the program pair representation.

In response to "n" being a compound node, the method 600 may proceed from block 604 to block 606. At block 606, a descendent node "c" (e.g., a direct child node) of "n" may be identified and selected for potential removal. In some embodiments, the descendent node "c" may be selected for potential removal based on the descendent node "c" being a direct child node of "n." Further, the descendent node "c" may be part of a particular path of multiple paths that may originate from the compound node "n."

At block 608, it may be determined whether "c" is a matching node. In response to "c" being a matching node, the method 600 may proceed from block 608 to block 610.

At block 610, the descendent node "c" of the node "n" may be removed in both the first graphical representation and the second graphical representation. In some embodiments, removal of the descendent node "c" may include replacement of the descendent node "c" with a descendent node (e.g., child node) "c" of "c." Following block 610, the method 600 may proceed to block 612.

At block 612, it may be determined whether the first and second properties are satisfied. As indicated above, the first property may be that the buggy version still includes the error after the reduction has been applied. As such, at block 612 it may be determined whether the buggy version still includes the error after removal of the node "c" in the first graphical representation of the program pair representation (e.g., after "c" has been replaced with "c" in the first graphical representation). Additionally or alternatively, the second property may be that the error is still corrected in the repaired version after the removal has been applied. As such, at block 612 it may also be determined whether the repaired version still corrects the error after the node "c" has been removed in the second graphical representation of the program pair representation (e.g., after the node "c" has been replaced by "c").

In response to both properties being satisfied (e.g., the modified buggy version still includes the error and the modified repaired version still corrects the error), the method 600 may proceed from block 612 to block 614. At block 614, the removal of "c" in both the first graphical representation and the second graphical representation may be maintained.

Alternatively, in response to one or both of the properties not being satisfied (e.g., the modified buggy version does not include the error and/or the modified repaired version does not correct the error), the method 600 may proceed from block 612 to block 620. At block 620, the removal of "c" in both the first graphical representation and the second graphical representation may be rejected.

In some embodiments, after removal of "c" at block 614, the new direct child node of "n" (e.g., "c") of the particular path may be analyzed for removal according to blocks 610, 612, 614, and 620. Such a process may be repeated until no more direct children nodes of "n" of the particular path may be removed (e.g., until the entire particular path is removed or the current direct child node is unable to be removed (e.g., in response to removal of the current direct child node not satisfying the first and second properties)).

Returning to block 608, in response to "n" not being a matching node, the method 600 may proceed from block 608 to block 616. At block 616, the descendent node "c" of the node "n" may be removed from the graphical representation of which the nodes "n" and "c" are included. Following block 616, the method 600 may proceed to block 618.

At block 618, it may be determined whether the property that corresponds to the graphical representation of which the node "n" is included is satisfied. For example, in instances in which "n" is included in the first graphical representation that represents the buggy version, it may be determined whether the first property is satisfied after removal of "c". Similarly, in instances in which "n" is included in the second graphical representation that represents the repaired version, it may be determined whether the second property is satisfied after removal of "c".

In response to the applicable property being satisfied (e.g., the modified buggy version still includes the error or the modified repaired version still corrects the error), the method 600 may proceed from block 618 to block 614. At block 614, the removal of "c" may be maintained.

Alternatively, in response to the applicable property not being satisfied (e.g., the modified buggy version does not include the error or the modified repaired version does not correct the error), the method 600 may proceed from block 618 to block 620. At block 620, the removal of "c" in the corresponding graphical representation may be rejected.

In some embodiments, after removal of "c" at block 614, the new direct child node of "n" (e.g., "c") of the particular path may be analyzed for removal according to blocks 608, 616, 618, and 620. Such a process may be repeated until no more direct children nodes of "n" of the particular path may be removed (e.g., until the entire particular path is removed or the current direct child node is unable to be removed (e.g., in response to removal of the current direct child node not satisfying the first and second properties)).

Modifications, additions, or omissions may be made to the method 600 without departing from the scope of the present disclosure. For example, the operations of method 600 may be implemented in differing order. Further, in some embodiments, the method 600 may be performed iteratively in a top down manner with respect to each of the nodes of the graphical representations of the program pair representations.

Further, as indicated above, in some embodiments, one or more operations of the method 500 may be performed with respect to a particular node and one or more operations of a method 600 of FIG. 6 may also be performed with respect to the particular node. As such, the methods 500 and 600 may be performed in a same embodiment in some instances.

FIGS. 7A-7F are now discussed to provide an example as to how one or more of the operations of the methods 400, 500, and 600 may be performed with respect to an example buggy version of source code and an example repaired version of the source code.

For example, FIG. 7A illustrates a buggy version 702 of source code that includes an error 704. Additionally, FIG. 7A illustrates a repaired version 706 of the source code that includes a repair 708 that corrects the error 704. FIG. 7B illustrates a tree structure 710 as an example first graphical representation, which may represent the buggy version 702. Similarly, FIG. 7B illustrates a tree structure 712 as an example second graphical representation, which may represent the repaired version 706. Further, FIG. 7B illustrates example matching edges 714 (matching edges 714a-714m) that link corresponding matching nodes between the first graphical representation 710 and the second graphical representation 712. The first graphical representation 710 linked with the second graphical representation 712 via the matching edges 714 may constitute an example program pair representation 716 of the buggy version 702 and the repaired version 706. In FIG. 7B, the matching nodes of the first graphical representation 710 and the second graphical representation 712 are denoted with solid lines and the unmatched nodes that are not shared between the first graphical representation 710 and the second graphical representation 712 are denoted with dashed lines. The generation of the program pair representation 716 may be obtained by performing one or more operations of blocks 402, 404, and 406 of the method 400 in some embodiments.

Figure 7C:
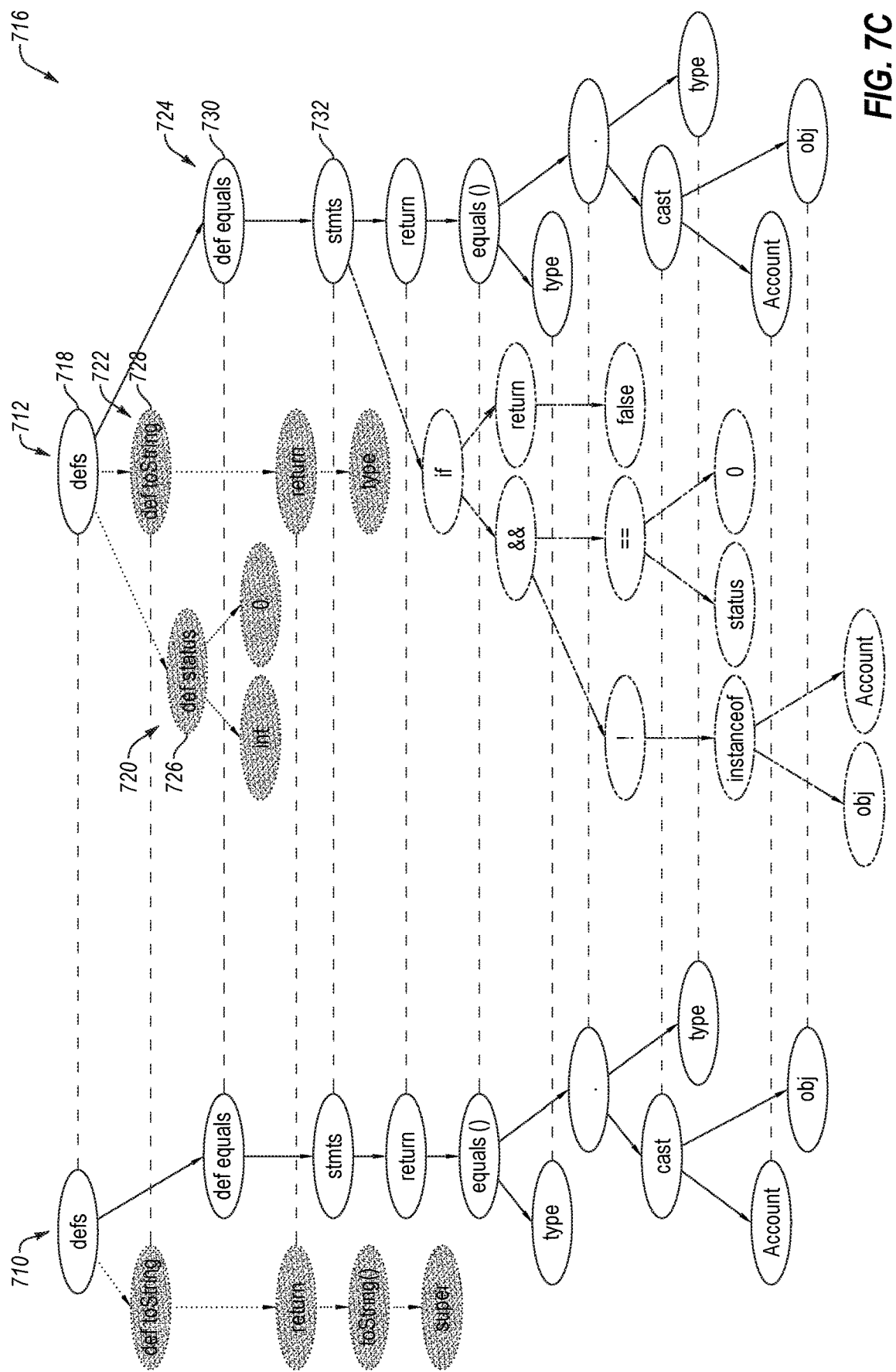

FIG. 7C illustrates the program pair representation 716 after first reductions that may be performed based on the methods 500 and 600 of FIGS. 5 and 6, respectively. For example, a node 718 of the second graphical representation 712 may be selected first for analysis based on the top-down analysis and based on the node 718 being the root of the largest tree between the first graphical representation 710 and the second graphical representation 712.

Applying the method 500, it may be determined that the node 718 does not include any compatible descendent nodes, such that the node 718 may not be removed. In some embodiments, the node 718 may then be analyzed according to the method 600 in response to such a determination. In these or other embodiments, the method 600 may be applied to the node 718 without first applying the method 500.

Applying block 602 of the method 600, it may be determined that the node 718 is a compound node having a first path 720, a second path 722, and a third path 724. The first path 720 may include a node 726, which may be a first child node of the node 718, the second path 722 may include a node 728, which may be a second child node of the node 718, and the third path 724 may include a node 730, which may be a third child node of the node 718.

Applying blocks 606, 608, 614, 616, 618, and 620 of the method 600 in an iterative manner with respect to the node 726 and its descendent nodes, the first path 720 may be removed from the second graphical representation. Further, applying blocks 606, 608, 610, 612, 614, and 620, of the method 600 with respect to the node 728 and its descendent nodes, the second path 722 may be removed from the second graphical representation 712. Further, nodes of the second path 722 that are matching nodes with respect to the first graphical representation 710 may also be removed concurrently. The removal of nodes and/or branches is indicated in FIG. 7C by shading of the corresponding nodes.

Following removal of the nodes and paths as indicated in FIG. 7C, the iterative process of moving through nodes may continue. For example, following the reductions of FIG. 7C, the node 730 may be selected for analysis (e.g., as described with respect to block 502 of FIG. 5). The node 730 may be selected based on the node 730 being the root node of the largest remaining subtree not yet analyzed and based on the node 730 and corresponding subtree not having yet been analyzed. Using the methods 500 and 600, it may be determined that the node 730 does not include any compatible descendants and is not a compound node. As such, the node 730 may be kept and no further analysis may be performed with respect to the node 730.

Following analysis of the node 730, the iterative process may then select a node 732 for analysis based on the node 732 being the root node of the largest remaining subtree not yet analyzed and based on the node 732 and corresponding subtree not having yet been analyzed. Using the method 500, it may be determined that the node 732 does not include any compatible descendants. Further, using the method 600, it may be determined that removal of any descendant nodes of the node 732 does not satisfy the first and/or second properties.

Figure 7D:
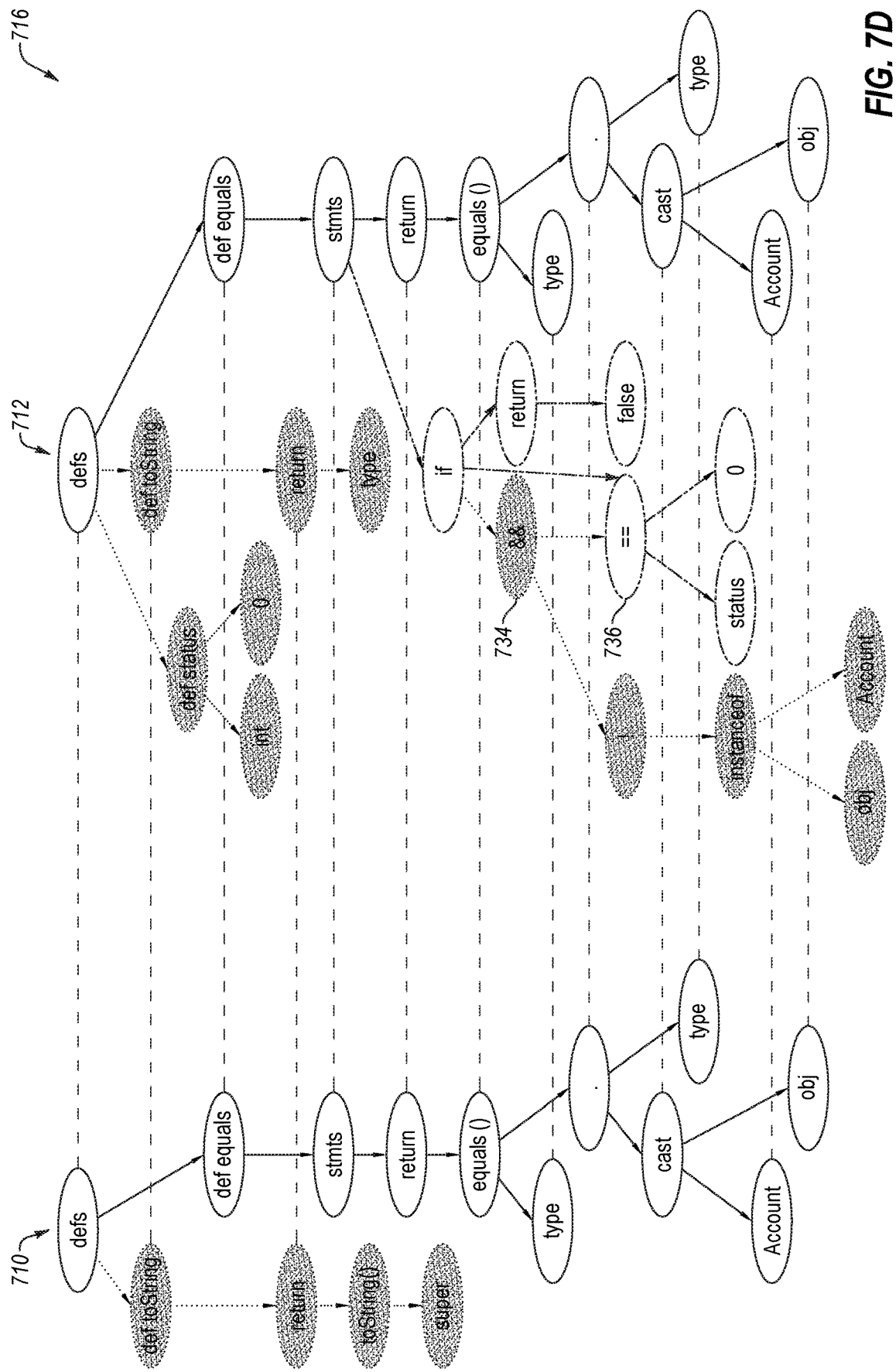

Following analysis of the node 732, the iterative process may later select a node 734 for analysis. Note that one or more other iterative operations may have been performed between those described, the specific examples are given to help further understanding of the concepts described in the present disclosure. Using the method 500, it may be determined that the node 736 may be a compatible descendent of the node 734 based on the "&&" and "==" elements being a same expression type. A proposed reduction of replacing the node 734 with the node 736, as indicated by FIG. 7D, may not satisfy the second property, therefore replacing the node 734 with the node 736 may be rejected.

Figure 7E:
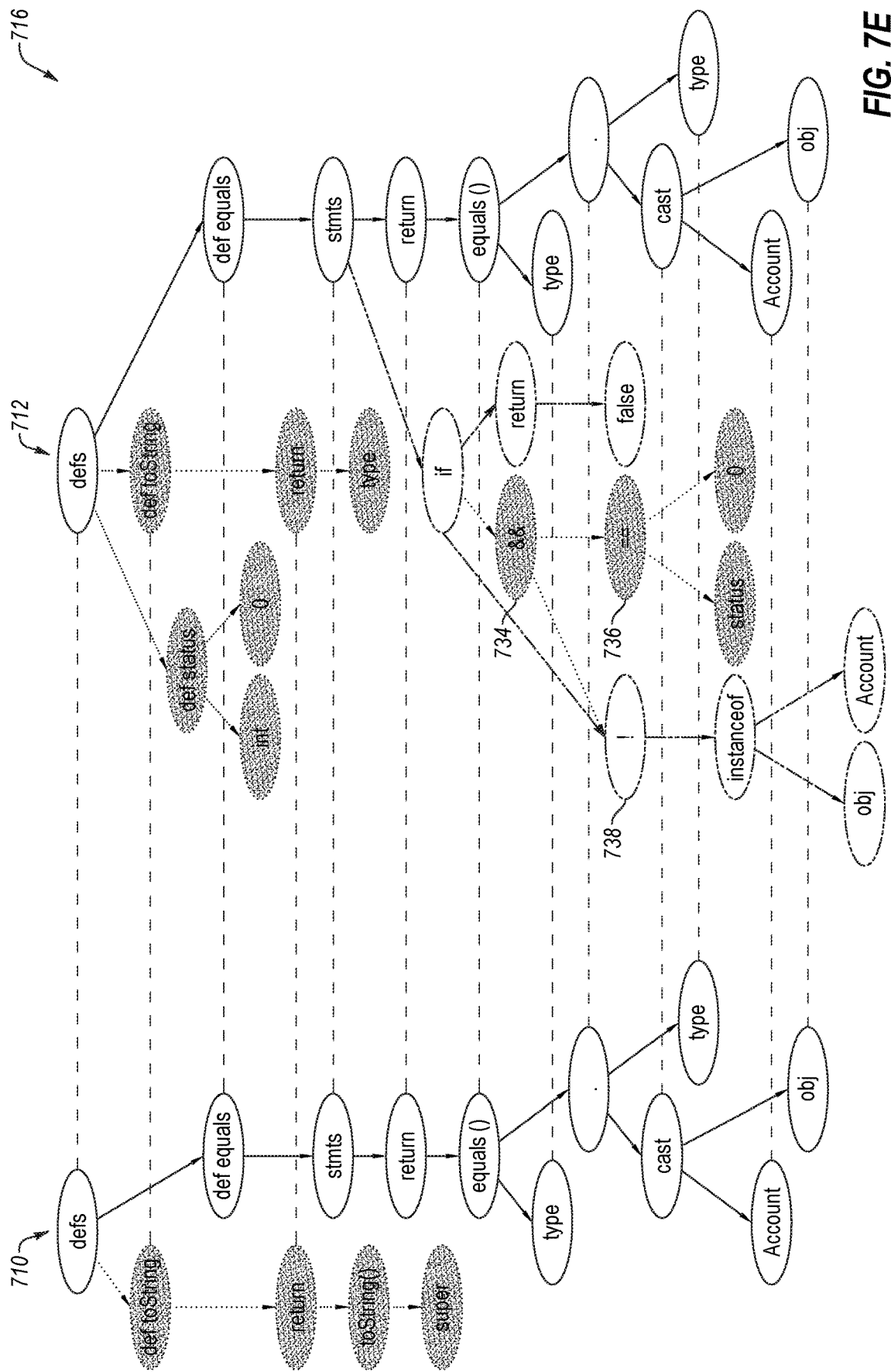

However, using the method 500, it may also be determined that the node 736 may be a compatible descendent of the node 734 based on the "&&" and '!' elements being a same expression type. A proposed reduction of replacing the node 734 with the node 738, as indicated by FIG. 7E, may satisfy the second property. Therefore replacing the node 734 with the node 738 may be accepted. Further, note that removing the node 734 by replacing it with the node 738 may include removing the node 736 and its corresponding descendant nodes.

Following the reduction indicated in FIG. 7E, the iterative process may not perform any more reductions because applying methods 500 and 600, any more reductions of any more remaining subtrees may not satisfy the applicable properties. In response to no more reductions being performed, a reduced buggy version 740 of the source code (depicted in FIG. 7F) and a reduced repaired version 742 of the source code (also depicted in FIG. 7F) may be generated. The reduced buggy version 740 may be generated based on the first graphical representation 710, as pruned as indicated in FIG. 7E. FIG. 7F illustrates which lines of the buggy version 702 and the repaired version 706 were removed to produce the reduced buggy version 740 and the reduced repaired version 742, respectively. In some embodiments, the reduced buggy version 740 and the reduced repaired version 742 may be used as a repair example.

The above example operations described with respect to FIGS. 7A-7F are merely examples of application of the methods 500 and 600 to generate a repair example. The above example is not meant to include or describe every operation that is performed, but is more to provide examples of some of the to some of the operations that may be performed according to the present disclosure.

Figure 8:
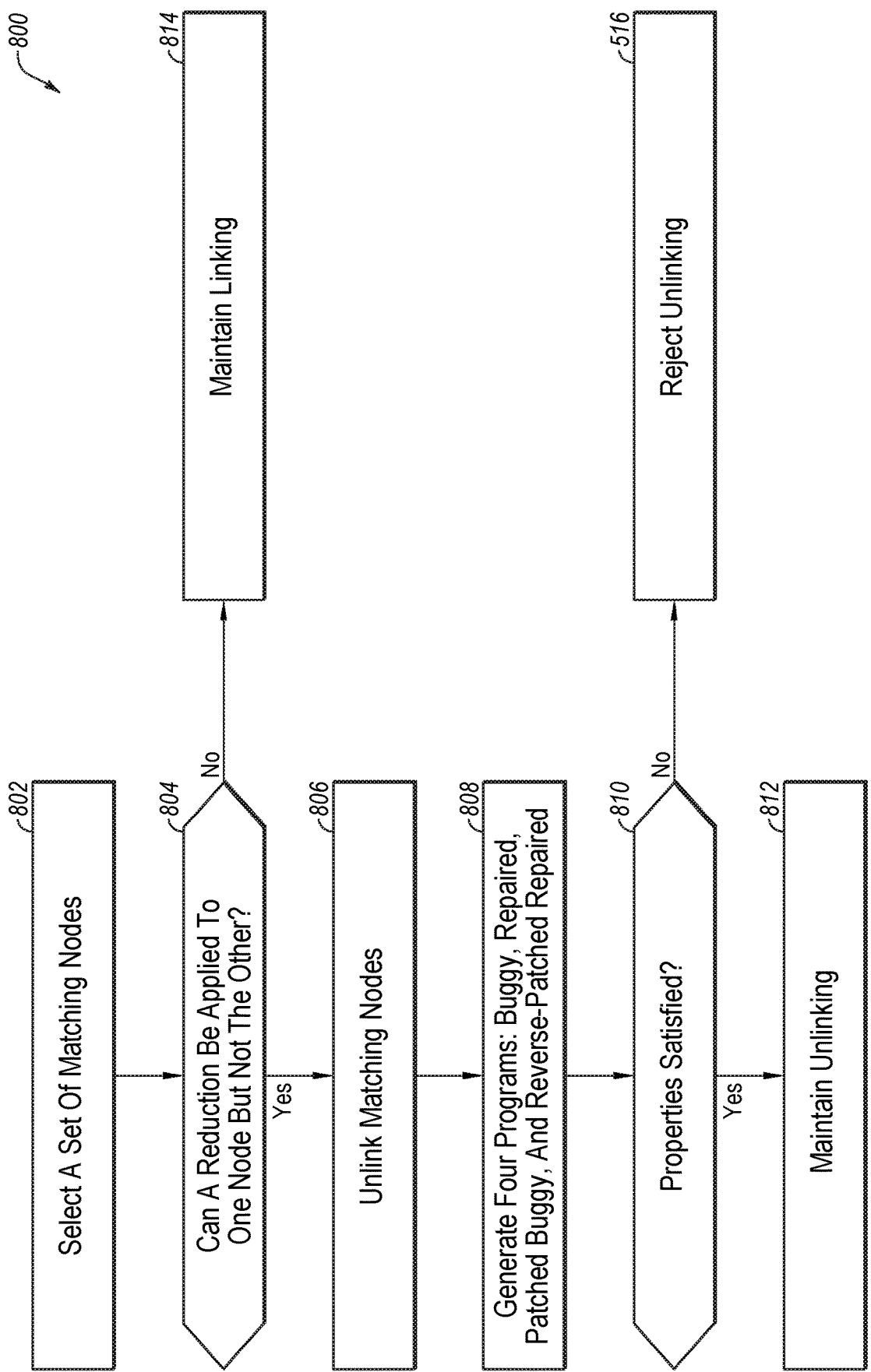
FIG. 8 is a flowchart of an example method of unlinking matching nodes.

As indicated above, in some instances further reduction of a program pair representation may be accomplished by unlinking matching nodes of the first and second graphical representations of the program pair representation. FIG. 8 is a flowchart of an example method 800 of unlinking matching nodes, according to at least one embodiment described in the present disclosure. In some embodiments, one or more of the operations of block 408 described above with respect to the method 400 of FIG. 4 may be performed according to the method 800. As described above, the program pair representation may be of a buggy version of source code and a corresponding repaired version of source code and may include a first graphical representation that represents the buggy version and a second graphical representation that represents the repaired version.

The method 800 may be performed by any suitable system, apparatus, or device. For example, one or more of the analysis module 106 of FIG. 1 or the computing system 302 of FIG. 3 (e.g., as directed by one or more modules) may perform one or more of the operations associated with the method 800. Although illustrated with discrete blocks, the steps and operations associated with one or more of the blocks of the method 800 may be divided into additional blocks, combined into fewer blocks, or eliminated, depending on the particular implementation.

The method 800 may begin at block 802, at which a set of matching nodes may be selected for potential unlinking. The set of matching nodes may include a first node of the first graphical representation and a same second node of the second graphical representation. In some embodiments, the first node and/or the second node may include a sub-tree that includes one or more unmatched nodes. A node and corresponding subtree that includes one or more unmatched nodes may be referred to as a "match hunk" in the present disclosure.

At block 804, it may be determined whether a reduction may be applied with respect to one of the matching nodes but not the other node of the matching nodes. The determination may be based on the meeting or not meeting of the first property that the buggy version still includes the error after the reduction and the second property that the repaired version still corrects the error after the reduction. For example, in some embodiments, the determination may be based on whether the first property is met whether the second property is not met, or vice versa.

For instance, in a first scenario, a first reduction applied with respect to both the first node and the second node may result in the first property being met and the second property not being met. As another example, in a second scenario, a second reduction applied with respect to both the first node and the second node may result in the first property not being met and the second property being met. The first scenario and the second scenario may each thus result in a determination that a reduction may be applied with respect to one of the matching nodes but not the other node of the matching nodes. Reference to a reduction being applied with respect to a node may include any suitable reduction such as described with respect to the method 400, the method 500 and/or the method 600 in which the reduction applies to the node or one or more descendant nodes and/or subtrees of the node. In many instances, the existence of the first scenario or of the second scenario may occur in instances in which at least one of the nodes of the set of matching nodes is part of a match hunk.

In response to the first scenario or the second scenario not applying, the method 800 may proceed from block 804 to block 814. At block 814, the linking between the matching nodes may be maintained.

By contrast, in response to the first scenario or the second scenario existing, the method 800 may proceed from block 804 to block 806. At block 806, the matching nodes may be unlinked. For example, the matching edges between the matching nodes may be removed. In some embodiments, the unlinking of the matching nodes may be such that the fourth reduction rule described above with respect to the same reductions being applied to matching nodes may not be applicable even to the unlinked nodes. Further, unlinking of the matching nodes may also unlink any corresponding match hunks.

At block 808, it may be determined whether the first and second properties are satisfied with respect to four different code versions that may be generated based on the unlinking. For example, a first code version may be generated that is the current buggy version, a second code version may be generated that is current repaired version, a third code version may be generated as a reverse-patched repaired version, and a fourth version may be generated as a patched buggy version.

The reverse patched repaired version may be generated from unlinked matching hunks that correspond to the second program representation that represents the repaired version and linked matching hunks that correspond to the first program representation that represents the buggy version. Further, the patched buggy version may be generated from unlinked matching hunks that correspond to the first program representation that represents the buggy version and linked matching hunks that correspond to the second program representation that represents the repaired version.

Figure 9:
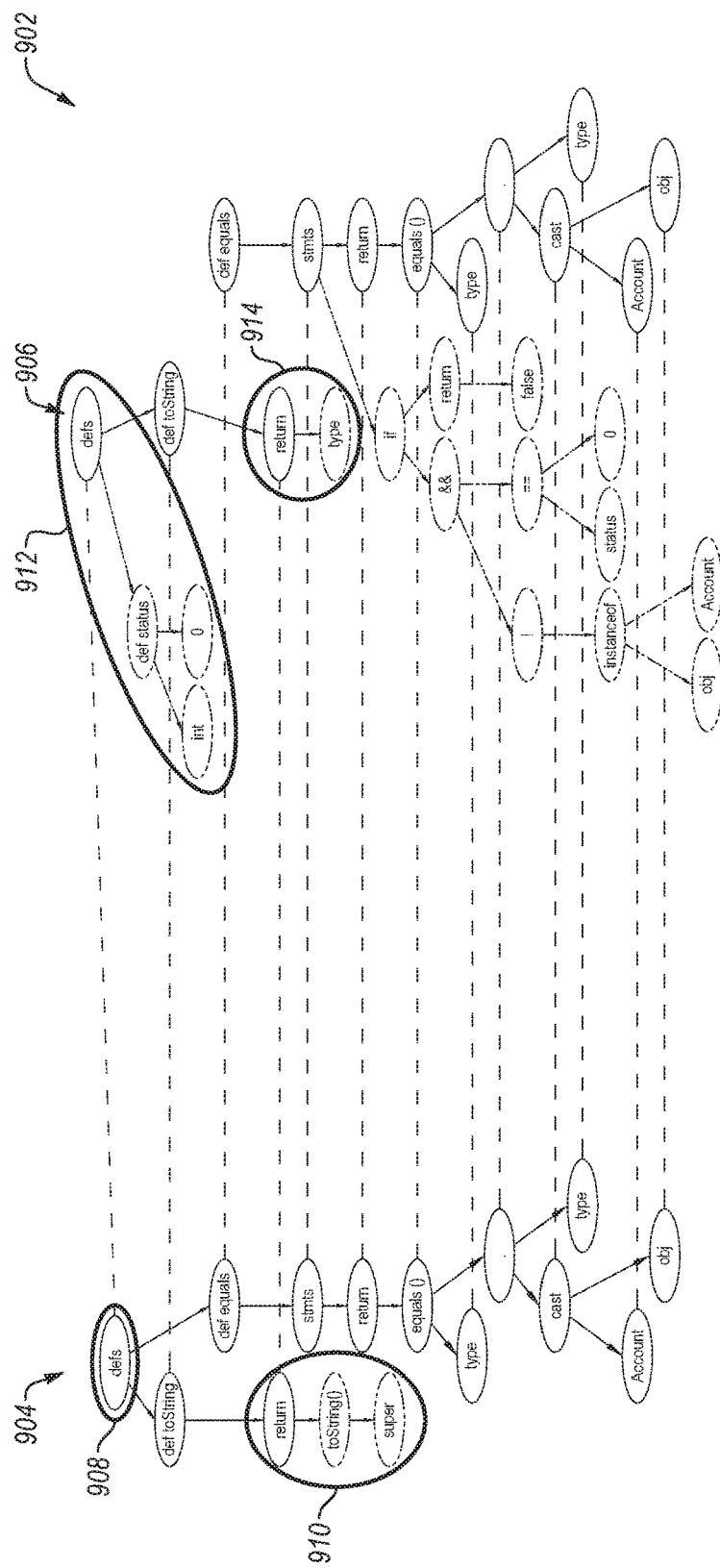
FIG. 9 illustrates an example application of one or more operations of the method of FIG. 8.

By way of example, FIG. 9 illustrates an example program pair representation 902 that includes a first graphical representation 904 and a second graphical representation 906. The first graphical representation 904 may represent a buggy version of source code and the second graphical representation 906 may represent a repaired version of source code. The first graphical representation 904 may include an unlinked hunk 908 and an unlinked hunk 910. The second graphical representation may include an unlinked hunk 912 and an unlinked hunk 914.

FIG. 9 also includes an example reverse-patched repaired version 920 of the source code. The generation of the reverse-patched repaired version 920 may include replacing the unlinked hunk 908 in the first graphical representation 904 with the unlinked hunk 912 of the second graphical representation 906. Further, the generation of the reverse-patched repaired version 920 may include replacing the unlinked hunk 910 in the first graphical representation 904 with the unlinked hunk 914 of the second graphical representation 906. The reverse-patched repaired version 920 may then be generated based on the resulting graphical representation.

FIG. 9 also includes an example patched buggy version 922 of the source code. The generation of the patched buggy version 922 may include replacing the unlinked hunk 912 in the second graphical representation 906 with the unlinked hunk 908 of the first graphical representation 904. Further, the generation of the patched buggy version 922 may include replacing the unlinked hunk 914 in the second graphical representation 906 with the unlinked hunk 910 of the first graphical representation 904. The patched buggy version 922 may then be generated based on the resulting graphical representation. The replacement of unlinked matched hunks with certain unlinked matched hunks may be based on the pairs of unlinked matched hunks being previously linked.

Returning to FIG. 8. After generation of the four programs at block 810, it may be determined whether the first property or the second property are satisfied by the four versions. For example, it may be determined whether the current buggy version and the reversed-patched repaired version satisfy the first property. Further, it may be determined whether the current repaired version and the patched buggy version satisfy the second property.

In response to the current buggy version and the reversed-patched repaired version satisfying the first property and the current repaired version and the patched buggy version satisfying the second property, the method 800 may proceed from block 810 to block 812, at which the unlinking may be maintained. By contrast, in response to one or more of the versions not satisfying its corresponding property, the method 800 may proceed from block 810 to block 816, at which the unlinking may be rejected.

Modifications, additions, or omissions may be made to the method 800 without departing from the scope of the present disclosure. For example some of the operations of method 800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For instance, in some embodiments, the operations with respect to blocks 802, 804, 806, and 814 may be performed with respect to each of the sets of matching nodes and/or hunks before performing the operations of blocks 808, 810, 812, and 816. Additionally or alternatively, all of method 800 may be performed iteratively with respect to individual sets of matching nodes and/or hunks before repeating method 800.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. This interpretation of the phrase "A or B" is still applicable even though the term "A and/or B" may be used at times to include the possibilities of "A" or "B" or "A and B."

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
generating a first graphical representation of a buggy version of source code of a software program;
generating a second graphical representation of a repaired version of the source code in which the buggy version includes an error and the error has been corrected in the repaired version;
identifying, as matching nodes, a first node of the first graphical representation and a second node of the second graphical representation that match each other;
applying a same reduction to the first node and to the second node concurrently to generate a reduced buggy version of the source code and a reduced repaired version of the source code, the reduction being applied concurrently to the first node and the second node in response to the first node and the second node being matching nodes, the reduction including one or more of: removing the matching nodes and applying a transformation to respective elements of the matching nodes; and
generating a repair example with respect to correcting the error in which the repair example is based on the reduced buggy version and the reduced repaired version.

2. The method of claim 1, wherein the reduction includes removing the matching nodes in response to the matching nodes each being a descendent node of a compound node.

3. The method of claim 1, wherein the reduction includes removing the matching nodes in response to the matching nodes having a descendent node that is of a same expression type.

4. The method of claim 1, wherein the reduction includes applying a same transformation to first code elements of the buggy version that correspond to the first node and to second code elements of the repaired version that correspond to the second node.

5. The method of claim 1, wherein the first node and the second node are first matching nodes and the method further comprises:
identifying, as second matching nodes, a third node of the first graphical representation and a fourth node of the second graphical representation that match each other; and
unlinking the third node and the fourth node as matching nodes such that a reduction that applies to the third node is not required to be applied to the fourth node.

6. The method of claim 1, wherein the same reduction is applied to the first node and the second node in response to:
the reduced buggy version still including the error after the reduction; and
the error still being corrected in the reduced repaired version after the reduction.

7. The method of claim 1, wherein the first graphical representation includes a third node that does not match any node of the second graphical representation and the method further comprises applying an other reduction to the third node in response to the reduced buggy version still including the error after the other reduction.

8. The method of claim 1, wherein the second graphical representation includes a third node that does not match any node of the first graphical representation and the method further comprises applying an other reduction to the third node in response to the error still being corrected in the reduced repaired version after the other reduction.

9. One or more non-transitory computer-readable storage media configured to store instructions that, in response to being executed, cause a system to perform operations, the operations comprising:
generating a first graphical representation of a buggy version of source code of a software program;
generating a second graphical representation of a repaired version of the source code in which the buggy version includes an error and the error has been corrected in the repaired version;
identifying, as matching nodes, a first node of the first graphical representation and a second node of the second graphical representation that match each other;
applying a same reduction to the first node and to the second node concurrently to generate a reduced buggy version of the source code and a reduced repaired version of the source code, the reduction being applied concurrently to the first node and the second node in response to the first node and the second node being matching nodes, the reduction including one or more of: removing the matching nodes and applying a transformation to respective elements of the matching nodes; and
generating a repair example with respect to correcting the error in which the repair example is based on the reduced buggy version and the reduced repaired version.

10. The one or more non-transitory computer-readable storage media of claim 9, wherein the reduction includes removing the matching nodes in response to the matching nodes each being a descendent node of a compound node.

11. The one or more non-transitory computer-readable storage media of claim 9, wherein the reduction includes removing the matching nodes in response to the matching nodes having a descendent node that is of a same expression type.

12. The one or more non-transitory computer-readable storage media of claim 9, wherein the reduction includes applying a same transformation to first code elements of the buggy version that correspond to the first node and to second code elements of the repaired version that correspond to the second node.

13. The one or more non-transitory computer-readable storage media of claim 9, wherein the first node and the second node are first matching nodes and the operations further comprise:
identifying, as second matching nodes, a third node of the first graphical representation and a fourth node of the second graphical representation that match each other; and
unlinking the third node and the fourth node as matching nodes such that a reduction that applies to the third node is not required to be applied to the fourth node.

14. The one or more non-transitory computer-readable storage media of claim 9, wherein the same reduction is applied to the first node and the second node in response to:
the reduced buggy version still including the error after the reduction; and
the error still being corrected in the reduced repaired version after the reduction.

15. The one or more non-transitory computer-readable storage media of claim 9, wherein the first graphical representation includes a third node that does not match any node of the second graphical representation and the operations further comprise applying an other reduction to the third node in response to the reduced buggy version still including the error after the other reduction.

16. The one or more non-transitory computer-readable storage media of claim 9, wherein the second graphical representation includes a third node that does not match any node of the first graphical representation and the operations further comprise applying an other reduction to the third node in response to the error still being corrected in the reduced repaired version after the other reduction.

17. A system comprising:
one or more processors; and
one or more non-transitory computer-readable storage media configured to store instructions that, in response to being executed by the one or more processors, cause the system to perform operations, the operations comprising:
generating a first graphical representation of a buggy version of source code of a software program;
generating a second graphical representation of a repaired version of the source code in which the buggy version includes an error and the error has been corrected in the repaired version;
identifying, as matching nodes, a first node of the first graphical representation and a second node of the second graphical representation that match each other;
applying a same reduction to the first node and to the second node concurrently to generate a reduced buggy version of the source code and a reduced repaired version of the source code, the reduction being applied concurrently to the first node and the second node in response to the first node and the second node being matching nodes, the reduction including one or more of: removing the matching nodes and applying a transformation to respective elements of the matching nodes; and
generating a repair example with respect to correcting the error in which the repair example is based on the reduced buggy version and the reduced repaired version.

18. The system of claim 17, wherein the reduction includes removing the matching nodes in response to the matching nodes each being a descendent node of a compound node.

19. The system of claim 17, wherein the reduction includes removing the matching nodes in response to the matching nodes having a descendent node that is of a same expression type.

20. The system of claim 17, wherein the reduction includes applying a same transformation to first code elements of the buggy version that correspond to the first node and to second code elements of the repaired version that correspond to the second node.

* * * * *